United States Patent [19]
Perlman et al.

[11] Patent Number: 5,313,465
[45] Date of Patent: May 17, 1994

[54] METHOD OF MERGING NETWORKS ACROSS A COMMON BACKBONE NETWORK

[75] Inventors: Radia J. Perlman, Acton; Christopher W. Gunner, Harvard, both of Mass.

[73] Assignee: Digital Equipment Corporation, Maynard, Mass.

[21] Appl. No.: 882,510

[22] Filed: May 13, 1992

[51] Int. Cl.[5] ............................................. H04J 3/02
[52] U.S. Cl. ................................. 370/85.13; 370/94.1
[58] Field of Search ................... 370/79, 85.13, 85.14, 370/94.1

[56] References Cited

U.S. PATENT DOCUMENTS

| | | | |
|---|---|---|---|
| 4,706,081 | 11/1987 | Hart et al. | 340/825.03 |
| 5,046,065 | 9/1991 | Göertz | 370/85.13 |
| 5,088,032 | 2/1992 | Bosack | 395/200 |
| 5,134,610 | 7/1992 | Shand et al. | 370/94.1 X |

OTHER PUBLICATIONS

*Fault-Tolerant Broadcast of Routing Information*, R. Perlman, North-Holland Computer Networks 7 (1983).
*An Algorithm for Distributed Computation of a Spanning Tree in an Extended LAN*, R. Perlman, Digital Equipment Corporation, 1984.
*Enhanced AppleTalk Phase 2 Routing*, Preliminary Specification and Internet Draft (RFC), Apple Computer, Inc., Nov. 27, 1991.

Primary Examiner—Douglas W. Olms
Assistant Examiner—Russell W. Blum
Attorney, Agent, or Firm—Arnold, White & Durkee

[57] ABSTRACT

A method of merging networks across a common backbone network in which destinations are grouped into domains based on needs of network users to communicate with one another. Domain information is added to the level one routing control packets transmitted by the grouped destinations to identify the logical address (destination number coupled with domain number) of a specific destination. Additionally, routers in the network are configured with mapping information that relates the destination number of each associated destination with its logical address. Filtering information may be included in the configuration of the level one and level two routers. Filtering information identifies domains that associated destinations may transmit information to or receive information from. With filtering information, system routers can be configured to announce the reachability of specific destinations in selected domains based on overall system considerations.

9 Claims, 1 Drawing Sheet

METHOD OF MERGING NETWORKS ACROSS A COMMON BACKBONE NETWORK

FIELD OF THE INVENTION

The present invention relates to the transfer of information in computer networks and, more particularly, to a method of merging networks across a common backbone network.

BACKGROUND OF THE INVENTION

As computer networks evolve and grow larger, there is an increased possibility that address spaces will overlap between networks operating under the same protocol that seek to communicate with each other across a common backbone network. For clarity of discussion, the protocol operating in the networks seeking to communicate across the backbone will be referred to herein as protocol X. The Network Layer protocol operating in the backbone network will be referred to as protocol Y, which may be the same as protocol X. In general, it is desirable to allow some protocol X networks to communicate with each other across the protocol Y backbone network. On the other hand, it is well-known that it is not necessarily desirable to allow all the separate protocol X networks to merge together (i.e., communicate with one another), for one or more reasons. These reasons include network security and administrative considerations.

Another important reason for preventing communication between two given protocol X networks is the possibility of overlapping address spaces between the two networks. In some cases, overlapping address space occurs because addresses have been assigned in a non-coordinated manner across all the protocol X networks. One known solution to the problem of overlapping address spaces resulting from non-coordinated assignment of addresses is to change the addresses in one of the networks so that they do not conflict with the addresses of the other network. A more difficult situation involving overlapping address spaces arises when the overlap is necessitated because protocol X has such a small address space that it is an impossibility to assign unique addresses to the total number of nodes in all the separate protocol X networks. A method of merging protocol X networks having overlapping address spaces across a common backbone network regardless of the reason for the overlap is desirable.

SUMMARY OF THE INVENTION

The present invention is a method of merging networks across a common backbone network. Specifically, the method of the present invention facilitates the interconnection of networks operating under a common protocol over a common backbone network.

A system administrator groups protocol X destinations into domains based on the desirability and necessity of communication among various destinations. Domain information is added to the routing information transmitted by routers bordering protocol X destinations to identify the logical address (destination number coupled with domain number) of each specific protocol X destination. Additionally, level one and two routers in the network are configured with mapping information that relates each associated protocol X destination with its logical address. Data packets transmitted between routers are encapsulated with the domain number from which they originate and the domain number to which they are to be sent.

Filtering information determined by a system administrator is included in the configuration of the routers. Filtering information identifies domains that associated protocol X destinations may transmit information to or receive information from. Protocol X packets are encapsulated by the bordering XIS-routers into protocol Y packets for traversal of the backbone network. The encapsulation includes the domain number of the protocol X destination from which the protocol X packet originated and the domain number of the protocol X destination to which the protocol X packet is to be sent.

BRIEF DESCRIPTION OF THE DRAWINGS

Other advantages of the invention will become apparent upon reading the following detailed description and upon reference to the accompanying drawings, in which.

Figure 1:
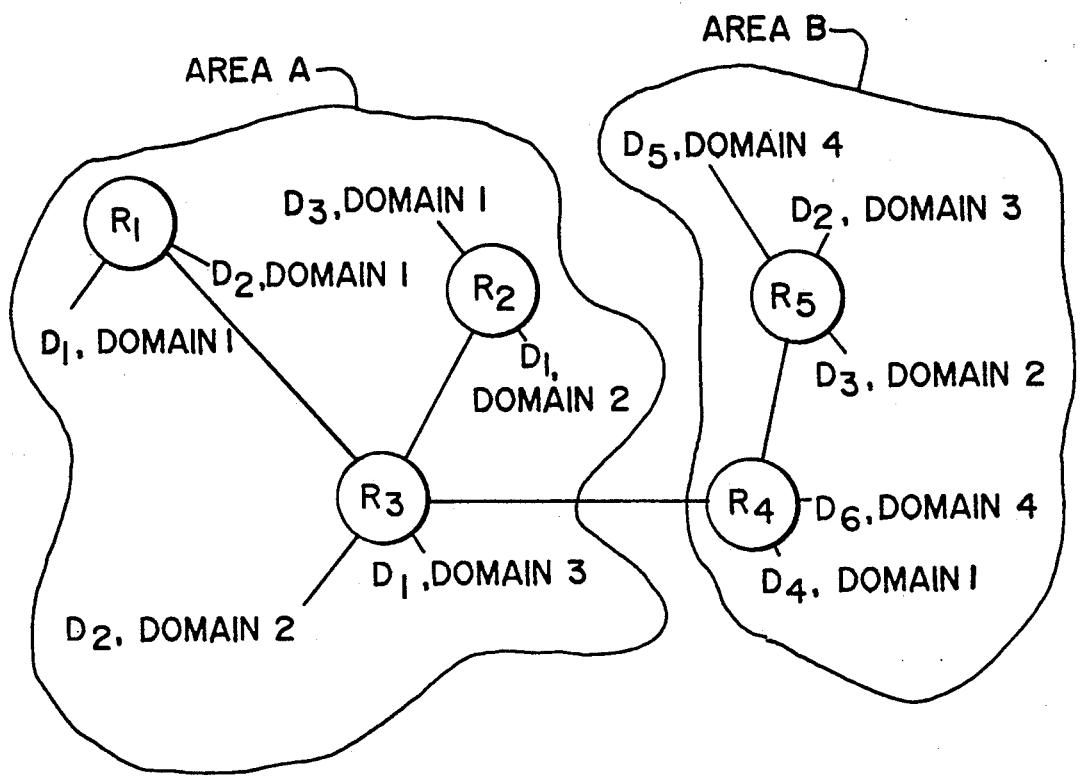
FIG. 1 is a simplified schematic diagram of a network topology in which protocol X destinations are assigned to specific domains and domain and protocol X destination information is transmitted throughout the system.

While the invention is susceptible to various modifications and alternative forms, specific embodiments thereof have been shown by way of example in the drawing and will herein be described in detail. It should be understood, however, that the invention is not intended to be limited to the particular forms disclosed. On the contrary, the applicants' intention is to cover all modifications, equivalents, and alternatives falling within the spirit and scope of the invention as defined by the appended claims.

DETAILED DESCRIPTION OF THE PREFERRED EMBODIMENTS

The present invention is particularly applicable as a method of controlling the merging of separate Appletalk TM networks across an Integrated IS-IS backbone network. However, the present invention can be used to control the merging of networks operating under any protocol when communicating across a backbone network operating under any protocol.

For clarity and consistency, several abbreviations are used herein. Network areas are identified by letters (e.g. area A, etc.). Routers are identified as "$R_n$" where n is a unique numeric designator. The protocol operating in a subnet in a given network area is referred to as protocol X. For exemplary purposes herein, protocol X is assumed to be the Appletalk TM protocol. The protocol operating in the backbone network is referred to as protocol Y. The exemplary assumption is made herein that the protocol Y is the IS-IS protocol. As previously noted, it is within the contemplation of the present invention for protocol X and protocol Y to be the same, but the identities of protocol X and protocol Y are not an essential feature of the present invention.

A router that is configured to support both protocol X and protocol Y is referred to as an XIS-router. A router that is configured to support only protocol X is referred to as an X-router. The procedures for configuring routers are well-known to those skilled in the art. The steps taken to configure routers are not an essential feature of the present invention. Novel aspects of the invention do, however, reside in the activities that the routers are configured to perform. Protocol X destinations are referred to as "$D_n$" where n is a unique numeric designator. Router ports to which protocol X destinations are connected are identified as $P_n$ and specific port addresses are identified as $A_n$, where n is a unique numeric designator.

In the exemplary embodiments discussed herein, destinations $D_n$ correspond to local area networks ("LANs") operating under the Appletalk ™ protocol. For other contemplated systems in which protocol X is not Appletalk ™, destinations do not necessarily correspond to LANs.

The present invention involves logically expanding the address space for the protocol X networks by adding additional address information, identified as domain information, to the XIS router. The domain information is determined by a system administrator to identify specific protocol X destinations that are able to communicate with each other.

To implement the present invention, each router in the backbone network that directly attaches to a protocol X destination or is a level two XIS-router in the backbone may be configured with domain information. This information includes the destination address identifying each protocol X destination attached to or reachable through the router, the port through which that protocol X destination is reachable and the domain to which each destination is assigned.

As an example, assume that it is desirable for a protocol X destination $D_1$ in area M to communicate with another protocol X destination $D_2$ in area N. Further assume that it is desired to allow communication between a protocol X destination $D_3$ in area O and another protocol X destination $D_4$ in area P, but that it is undesirable (or not beneficial) to allow communication between the set of destinations consisting of $D_1$ and $D_2$ and the set of destinations consisting of $D_3$ and $D_4$. In this circumstance, a useful solution would be to assign destinations $D_1$ and $D_2$ to domain one and destinations $D_3$ and $D_4$ to domain two. The network addresses of destinations $D_3$ and $D_4$ may be expressed as logical addresses $D_3$, domain two, and $D_4$, domain two. As will be fully described hereinafter, the routers associated with $D_1$ and $D_2$ are configured with filtering information to indicate that only communication between destinations in domain one is supported. Likewise, the routers associated with $D_3$ and $D_4$ are configured with filtering information to indicate that only communication between domain two destinations is supported by these routers.

As will be appreciated by those having ordinary skill in the art, a common practice in networks involves spreading information identifying destinations having the ability to communicate with one another. The propagation throughout the network of information relating to the identity and location of protocol X destinations can be accomplished using known techniques. Additionally, it is within the contemplation of the present invention for the propagation of this information to be accomplished according to the co-pending application Ser. No. 07/882,495, entitled Method for Supporting Foreign Protocols Across a Hierarchical Backbone Network of which the inventors are Radia Joy Perlman, Ian Michael Charles Shand and Christopher William Gunner, which is assigned to the assignee of the present invention, and filed May 13, 1992.

Individual router ports are configured to correspond to specific domains. For example, all protocol X destinations connected to port one of a given router are defined to be in a specific domain.

Level one XIS-routers bordering protocol X destinations are configured to add information about each neighboring protocol X destination and its domain to their level one routing control packets. Other level one XIS-routers within the area then learn this information through the operation of the IS-IS protocol and incorporate it into their forwarding database.

Level two XIS-routers in the backbone network transmit the domain information when describing reachable protocol X destinations in their level two routing control packets to other level two backbone routers in the network. They learn the protocol X information from all the level one routing control packets they receive. Each level two router additionally adds the source domain and destination domain information to each protocol X data packet it encapsulates in a protocol Y packet and forwards across the backbone network.

The concept of assigning protocol X destinations to domains facilitates the use of filtering information to accomplish other useful functions. As previously noted, it might be desirable to restrict communication between some protocol X destinations from a standpoint of network administration. The reasons for restricting communication in this manner include minimization of the burden on the routing protocol in the backbone network. Another reason for limiting information transfer between protocol X destinations is to allow communication among a group (or a domain) of protocol X destinations while maintaining security with respect to all other protocol X destinations. Administrative considerations are a third reason for restricting communication between protocol X destinations. For example, in many cases there is simply no requirement for protocol X destinations to communicate. A final reason that militates in favor of restricting communication among protocol X destinations or groups of destinations is to prevent confusion when transmitting routing information to X-routers within one of the protocol X destinations attached to the backbone network because X-routers that do not participate in the method of the present invention are not configured with domain mapping information.

As previously noted, each level one XIS-router is configured with a map that relates attached protocol X destinations to domain numbers. In a preferred embodiment, the mapping information is specific to each port that is attached to a protocol X destination. Additionally, each level one XIS-router is preferably configured, for each port, with a set of domain numbers that designate whether information is allowed to pass into or out of that port. In other words, access to a specific domain is "filtered" out by not including that domain in the configuration map of reachable domains. The configuration of each level one XIS-router may also include a set of domain numbers from which information is included in the router's level one routing control packet. The configuration of each level two router in a hierarchical backbone network may also include a set of domain numbers from which information is allowed to pass from level one into level two routing control packets and a separate set of domain numbers from which information is allowed to pass from level two into the router's level one routing control packets.

Referring to the drawings, FIG. 1 shows a simplified schematic diagram of a network topology in which protocol X destinations are assigned to specific domains and domain and protocol X destination information is transmitted throughout the network. Obviously, the network topology shown in FIG. 1 is exemplary. The method of the present invention is applicable to any network topology.

As shown in FIG. 1, a network area A includes protocol X destinations assigned to three domains, as follows: destinations $D_1$, $D_2$ and $D_3$ in domain one; destinations $D_1$ and $D_2$ in domain two; and destination $D_1$ in domain three. The domain to which each destination is assigned is included in the logical destination address in order to uniquely identify a given destination. In other words, any communication directed to destination $D_1$ in domain three must include "domain three" in the addressing information because there are three different destinations identified as $D_1$ in area A. Domain one destinations $D_1$ and $D_2$ are connected to a router $R_1$. Domain one destination $D_3$ and domain two destination $D_1$ are each connected to a router $R_2$. Table 1 shows the configuration information for each router in FIG. 1.

TABLE 1

Router Configuration Information

ROUTER $R_1$
Level 1 Routing Control Packet
X; $D_1$, domain 1
  $D_2$, domain 1
Configuration Information

| Port $P_m$, address $A_m$ | Port $P_n$, address $A_n$ |
|---|---|
| $D_1$, domain 1 | $D_2$, domain 1 |
| Filter: Pass domain 1 | Filter: Pass domain 1 |

ROUTER $R_2$
Level 1 Routing Control Packet
X; $D_1$, domain 2
  $D_3$, domain 1
Configuration Information

| Port $P_m$, address $A_m$ | Port $P_n$, address $A_n$ |
|---|---|
| $D_3$, domain 1 | $D_1$, domain 2 |
| Filter: Pass domain 1 | Filter: Pass domain 2 |

ROUTER $R_3$
Level 1 Routing Control Packet
X; $D_1$, domain 3
  $D_2$, domain 2
Level 2 Routing Control Packet
X; $D_1$–$D_3$, domain 1
  $D_1$–$D_2$, domain 2
  $D_1$, domain 3
Level 1 to Level 2
  Filter: Pass domains 1, 2, 3
Levels 2 to Level 1
  Filter: Pass domains 1, 2, 3
Configuration Information

| Port $P_m$, address $A_m$ | Port $P_n$, address $A_n$ |
|---|---|
| $D_1$, domain 3 | $D_2$, domain 2 |
| Filter: Pass domain 3 | Filter: Pass domain 2 |

ROUTER $R_4$
Level 1 Routing Control Packet
X; $D_6$, domain 4
  $D_4$, domain 1
Level 2 Routing Control Packet
X; $D_4$, domain 1
  $D_3$, domain 2
  $D_2$, domain 3
Level 1 to Level 2
  Filter: Pass domains 1, 2, 3
Level 2 to Level 1
  Filter: Pass domains 1, 2, 3
Configuration Information

| Port $P_m$, address $A_m$ | Port $P_n$, address $A_n$ |
|---|---|
| $D_6$, domain 4 | $D_4$, domain 1 |
| Filter: Pass domain 1, 4 | Filter: Pass domains 1, 4 |

ROUTER $R_5$
Level 1 Routing Control Packet
X; $D_5$, domain 4
  $D_2$, domain 3
  $D_3$, domain 2
Configuration Information TABLE 1-continued Router Configuration Information

| Port $P_m$, address $A_m$ | Port $P_n$, address $A_n$ |
|---|---|
| $D_5$, domain 4 | $D_2$, domain 3 |
| Filter: Pass domain 1, 4 | Filter: Pass domain 3 |

Port $P_o$, address $A_o$
$D_3$, domain 2
Filter: Pass domain 3

As shown in table 1, the level one routing control packets of the routers $R_1$ and $R_2$ are modified to contain fields indicating the presence of domain one destinations $D_1$ and $D_2$ (the level one routing control packet of the router $R_1$) and domain one destination $D_3$ and domain two destination $D_1$ (the level one routing control packet of the router $R_2$). The routers $R_1$ and $R_2$ are connected to a level two XIS-router $R_3$. As a level two router, the XIS-router $R_3$ has the capability of communicating with other network areas. Directly connected to the XIS-router $R_3$ are protocol X destinations $D_2$, domain two, and destination $D_1$, domain three. As previously noted, each of the routers $R_1$, $R_2$ and $R_3$ are configured with mapping information relating the destinations attached thereto the logical address that includes the destination number and domain number. Additionally, the routers are configured with filtering information for each port indicating domains with which communication is to be allowed.

Also shown in FIG. 1 is a network area B, which includes a level two XIS-router $R_4$, which is connected to the level two XIS-router $R_3$ in area A. Protocol X destinations $D_4$, domain one, and $D_6$, domain four, are connected to the XIS-router $R_4$. The XIS-router $R_4$ is connected to a level one XIS-router $R_5$, which is connected to protocol X destinations $D_5$, domain four, destination $D_2$, domain three, and destination $D_3$, domain two. As shown in table 1, the level one routing control packet of $R_5$ is modified to indicate that the router $R_5$ has access to protocol X destinations $D_5$, domain four, $D_2$, domain three and $D_3$, domain two. The router $R_5$ and the XIS router $R_4$ are configured with mapping information relating the network addresses of the protocol X destinations in area B to the logical addresses comprising the destination and domain numbers. The XIS-routers $R_3$ and $R_4$ are configured with filtering information for the transfer of information from level one to level two (and from level two to level one) indicating the domains that are to be announced in their level two routing control packets.

For the network topology shown in FIG. 1, the present invention makes communication between destinations assigned to the same domain possible. Also, the use of filtering information in the router per port mapping tables selectively allows communication between destinations in one domain and other domains. For example, the configuration information shown for the router $R_1$ indicates that $R_1$ may receive information from domain one only. Only protocol X destinations assigned to domain one may transmit to the protocol X destinations attached thereto. Because domain two is not listed in the configuration information, for port $P_n$, the router $R_1$ discards any protocol X packets received from domain two transmitted to port $P_n$.

Filtering information for the level two XIS-routers $R_3$ and $R_4$ includes what information learned from level one should be transferred into level two routing control packets originated by routers $R_3$ and $R_4$ and what information learned from level two should be transferred into level one routing control packets originated by router R₃ and R₄. Both of these routers are configured to transfer information about domains one, two and three but not domain four into their level two and level one routing control packets. This means that information about protocol X destinations in domains one, two and three is propagated between the areas A and B but information about domain four is not propagated with the result that protocol X destinations in domain four cannot be reached from area A (but can be reached within area B). Protocol X destinations in domains one, two and three can be reached from areas A and B.

Another contemplated embodiment of the invention can be used where the communication requirements between protocol X destinations are restricted so that only protocol X destinations assigned to the same domain are permitted to communicate with each other. In this embodiment, the encapsulation of protocol X packets in protocol Y packets requires only a single domain number to be added. This single domain number represents the source and destination domain (which, by definition, is the same number). Also, it is not necessary in this embodiment to configure protocol X packet filtering information in the XIS-routers because the protocol X packet filtering performed by the XIS-routers is defined to only allow communication between protocol X destinations in the same domain.

Thus, their has been described herein a method for controlling the merging of networks across a common backbone network. It will be understood that various changes in the details and arrangements of the implementation described herein will occur to those skilled in the art without departing from the principle and scope of the present invention. While the invention has been described with reference to the presently contemplated best mode for its practice, it is intended that this invention only be limited by the scope of the appended claims.

What is claimed is:

1. A method of merging at least some of a plurality of destinations across a common backbone network of said destinations operating under a first protocol and having a unique destination number associated therewith, said backbone network operating under a second protocol and having at least one router located therein, said at least one router transmitting routing control packets, said method comprising the steps of:

encoding the routing control packets of said at least one router with destination numbers and domain numbers to each of a plurality of destinations;

transmitting said routing control packets to at least one other router, wherein said at least one other router receives the routing control packets; and transmitting data packets between destinations having the same domain number based on said routing control packets, said data packets being encapsulated with information indicative of said domain number.

2. The method of merging of claim 1 wherein said first protocol and said second protocol are identical.

3. The method of merging of claim 1, further comprising the steps of:

configuring said at least one router to allow communication between destinations assigned specific domain numbers and to prevent communication between destinations assigned other domain numbers;

controlling the merging of said destinations according to the configured destination number and domain number by allowing communication between destinations configured to communicate with each other while preventing communication between domains not configured to communicate with each other; and transmitting data packets between domains configured to communicate with each other, said data packets being encapsulated with information indicative of the domain from which said data packets originated and the domain to which said data packets are bound.

4. The method of merging of claim 3 wherein said first protocol and said second protocol are identical.

5. A method of merging at least some of a plurality of destinations in at least one network that communicate by transmitting data packets across a common backbone network, each of said destinations operating under a first protocol and having a unique network address in said at least one network associated therewith, each of said destinations being attached to one of a plurality of routers, said backbone network operating under a second protocol, said first protocol and said second protocol being identical, said method comprising the steps of:

assigning domain numbers to each of a plurality of destinations;

configuring at least some of said routers with mapping information that relates a domain number to each specific destination;

configuring said routers with mapping information to allow communication between destinations assigned to specific domains and to prevent communication between destinations assigned to other specific domains; and encapsulating said data packets transmitted by said routers with information indicative of the domain in which the destination transmitting the data packet resides and with information indicative of the domain in which the destination to which the data packet is sent.

6. A method of merging at least some of a plurality of destinations in at least one network across a common backbone network, each of said destinations operating under a first protocol and having a unique network address in its respective network associated therewith, each of said destinations being attached to one of a plurality of routers, said backbone network operating under a second protocol, said method comprising the steps of:

assigning domain numbers to each of a plurality of destinations;

configuring at least some of said routers with mapping information that relates a domain number to each specific destination;

transmitting data packets between destinations in the same domain, said data packets being encapsulated with information indicative of said domain;

configuring said routers with mapping information to allow communication between destinations assigned to specific domains and to prevent communication between destinations assigned to other specific domains;

controlling the merging of said destinations according to said mapping information to allow communication between domains configured to communicate with each other while preventing communication between domains not configured to communicate with each other; and transmitting data packets between domains configured to communicate with each other, said data packets being encapsulated with information indicative of the domain from which said data packets originated and the domain to which said data packets are bound.

7. The method of merging of claim 6 wherein said first protocol and said second protocol are identical.

8. A method of merging at least some of a plurality of destinations across a hierarchical backbone network, each destination operating under a first protocol, and having a unique destination number, said hierarchical backbone network having at least two levels and operating under a second protocol, said hierarchical backbone network being comprised of a plurality of network areas having at least one level two router located therein, each of said level two routers being capable of inter-area communication, said method comprising the steps of:

assigning an associated domain number to at least some of said routers;

configuring at least some of said routers with mapping information relating said unique destination numbers to said associated domain number;

transmitting data packets between destinations having the same domain number, said data packets being encapsulated with information indicative of said domain number;

configuring said at least some of said routers to allow communication between selected ones of said domains and to prevent communication between other selected ones of said domains;

configuring at least some of said level two routers to announce the existence of selected destinations in selected domains to other network areas and to withhold announcement of other selected destinations in other selected domains, thereby preventing inter-area communication between destinations in domains, the existence of which are not announced to other network areas; and transmitting data packets between domains configured to communicate with each other, said data packets being encapsulated with information indicative of the domain from which said data packets originated and the domain to which said data packets are bound.

9. The method of merging of claim 8 wherein said first protocol and said second protocol are identical.

* * * * *